(12) United States Patent
Murakami et al.

(10) Patent No.: US 10,858,037 B2
(45) Date of Patent: Dec. 8, 2020

(54) POWER STEERING DEVICE

(71) Applicant: HITACHI AUTOMOTIVE SYSTEMS, LTD., Hitachinaka (JP)

(72) Inventors: Hiroki Murakami, Atsugi (JP); Kohtaro Shiino, Isehara (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 302 days.

(21) Appl. No.: 16/079,520

(22) PCT Filed: Jan. 20, 2017

(86) PCT No.: PCT/JP2017/001905
§ 371 (c)(1),
(2) Date: Aug. 23, 2018

(87) PCT Pub. No.: WO2017/145599
PCT Pub. Date: Aug. 31, 2017

(65) Prior Publication Data
US 2019/0047611 A1    Feb. 14, 2019

(30) Foreign Application Priority Data
Feb. 24, 2016  (JP) .................. 2016-032579

(51) Int. Cl.
*B62D 5/04*  (2006.01)
*H02K 5/22*  (2006.01)
(Continued)

(52) U.S. Cl.
CPC ......... *B62D 5/0406* (2013.01); *B62D 5/0481* (2013.01); *B62D 5/0487* (2013.01);
(Continued)

(58) Field of Classification Search
CPC .... B62D 5/0487; B62D 5/0481; B62D 5/046; B62D 5/0484; B62D 6/00; B62D 5/0463;
(Continued)

(56) References Cited

U.S. PATENT DOCUMENTS

| 5,573,079 A | 11/1996 | Suda et al. |
| 2010/0049403 A1* | 2/2010 | Gillman ................ H05K 5/064 701/43 |

(Continued)

FOREIGN PATENT DOCUMENTS

| JP | 08-026125 A | 1/1996 |
| JP | 2014-234102 A | 12/2014 |
| WO | WO-2017-006623 A1 | 1/2017 |

*Primary Examiner* — Kevin Hurley
*Assistant Examiner* — Marlon A Arce
(74) *Attorney, Agent, or Firm* — Foley & Lardner LLP

(57) ABSTRACT

A power steering apparatus according to the present invention comprises: a steering mechanism having a steering shaft and a rack bar which steers steer steerable wheels by a movement in an axial direction of the rack bar in association with a rotation of steering shaft; an electrically driven motor having a stator, a rotor, and a drive shaft integrally rotated with the rotor; a worm gear transmitting the rotation of the drive shaft to the steering mechanism; a housing member having a reduction gear housing section, a rack bar housing section, and a motor ECU housing section in which the electrically driven motor and the control circuit are housed; and a moisture detection sensor having a moisture detection section disposed within the reduction gear housing section and a transmission section connected with the control circuit passing through an inner part of the motor ECU housing from the moisture detection section.

21 Claims, 13 Drawing Sheets

(51) Int. Cl.

| | |
|---|---|
| *H02K 7/116* | (2006.01) |
| *H02K 11/33* | (2016.01) |
| *H02K 11/20* | (2016.01) |
| *B62D 6/00* | (2006.01) |
| *G01L 5/22* | (2006.01) |
| *G01N 27/12* | (2006.01) |
| *B62D 6/08* | (2006.01) |
| *H02K 11/21* | (2016.01) |

(52) U.S. Cl.
CPC ........... *H02K 5/225* (2013.01); *H02K 7/1166* (2013.01); *H02K 11/20* (2016.01); *H02K 11/33* (2016.01); *B62D 5/0463* (2013.01); *B62D 5/0484* (2013.01); *B62D 6/00* (2013.01); *B62D 6/08* (2013.01); *G01L 5/221* (2013.01); *G01N 27/121* (2013.01); *H02K 11/21* (2016.01)

(58) Field of Classification Search
CPC ........ B62D 6/08; G01L 5/221; G01N 27/121; B60Y 2400/307
See application file for complete search history.

(56) References Cited

U.S. PATENT DOCUMENTS

| | | | |
|---|---|---|---|
| 2013/0138299 A1 | 5/2013 | Bhae et al. | |
| 2017/0050669 A1* | 2/2017 | Asakura | B62D 5/0481 |
| 2018/0194390 A1* | 7/2018 | Goto | B62D 5/0481 |
| 2019/0193780 A1* | 6/2019 | Rácz | B62D 5/0487 |
| 2019/0248408 A1* | 8/2019 | Boda | G01N 27/048 |

* cited by examiner

POWER STEERING DEVICE

TECHNICAL FIELD

The present invention relates to a power steering apparatus to be applied to a vehicle.

BACKGROUND ART

A conventional power steering apparatus has been described in Patent Document 1 which will be described below.

This power steering apparatus includes a reduction gear which transmits a rotational force of an electrically driven motor to a rack bar by converting the rotational force into a movement force in an axial direction of the rack bar while decelerating the rotational force of the electrically driven motor. In addition, while outer peripheries of the rack bar and the reduction gear are covered in a liquid tight manner with a housing member and a moisture detection sensor is disposed at a lower end section in the vertical direction of an inner part of the housing member.

The moisture detection sensor is constituted by a pair of electrodes arranged mutually spaced apart from each other and the respective electrodes are electrically connected to an ECU (a control unit). The above-described ECU applies a voltage to one of the pair of electrodes and monitors the applied voltage of the other of the pair of electrodes. In a case where the voltage is applied to the other of the pair of electrodes, the ECU determines a state in which both of the pair of electrodes are conducted via moisture, namely, an abnormal state in which moisture is invaded into the inside of the housing member and calls attention to a vehicle driver.

Then, a countermeasure against the invasion of the moisture into the inside of the housing member is made at an early timing through the call attention described above so that the power steering apparatus suppresses a generation of an inconvenience (for example, a generation of rust of the reduction gear and so forth) due to a long time residence of moisture into the inside of the housing member.

Pre-Published Document

Patent Document 1: a Japanese Patent Application Laid-open Publication JP2014-234102

DISCLOSURE OF THE INVENTION

Problem to be Solved by the Invention

Incidentally, it is a general practice that a connection of the moisture detection sensor and the ECU is carried out via a transmission section such as a harness which is disposed at an outside of the housing member and whose outer periphery is sealed with, for example, a tube member.

However, there is a possibility that a sealing of transmission section with the tube member tends to be broken with small stones and so forth jumped up from one or both of driving wheels during a traveling of the vehicle. In this case, moisture is introduced from a breakage section of the tube member, transmitted via the transmission section, and invaded into the inside (inner part) of the ECU. Thus, there is a possibility of unintentional short-circuiting occurs and an erroneous operation mode is introduced.

With the above-described technical problem in mind, it is an object of the present invention to provide a power steering apparatus which is capable of effectively suppressing the invasion of moisture into the inside of the control unit.

Means for Solving the Problem

According to the present invention, there is provided a power steering apparatus, comprising: a steering mechanism including: a steering shaft which rotates in association with a rotation of a steering wheel; and a rack bar which steers steerable wheels by an axial movement of the rack bar in association with the rotation of the steering shaft; an electrically driven motor including: a motor housing section; a stator and a rotor, both of which are disposed within the motor housing section; and a drive shaft which rotates in association with the rotation of the rotor; a control unit including: a control circuit which drivingly controls the electrically driven motor; a control circuit housing section which houses the control circuit; and an ECU housing section, the ECU housing section being formed to communicate with the motor housing section in an inner part of the ECU housing section and constituting a motor ECU housing section together with the motor housing section; a reduction gear which transmits the rotation of the drive shaft to the steering mechanism; a rack bar housing section in an inner part of which at least a part of the rack bar is housed; a reduction gear housing section which houses the reduction gear, which is formed to communicate with the rack bar housing section and the motor ECU housing section, and which constitutes a housing member together with the motor ECU housing section and the rack bar housing section; a moisture detection sensor including: a moisture detection section disposed in an inner part of the reduction gear housing section or the rack bar housing section to detect moisture; and a transmission section which is formed to extend from the moisture detection section into the motor ECU housing section and serves to transmit an electrical signal between the moisture detection section and the control circuit by an electrical connection of the moisture detection section with the control circuit; and an abnormality responding section disposed in the control circuit to perform an output of an alarm signal or to perform an information storage of the moisture detection when moisture is detected by the moisture detection sensor.

Effect of the Invention

According to the present invention, the invasion of moisture into the inside of the control unit can effectively be suppressed.

EMBODIMENTS FOR CARRYING OUT THE INVENTION

Hereinafter, each preferred embodiment of a power steering apparatus according to the present invention will be described in details on a basis of accompanied drawings.

First Embodiment

Figure 1:
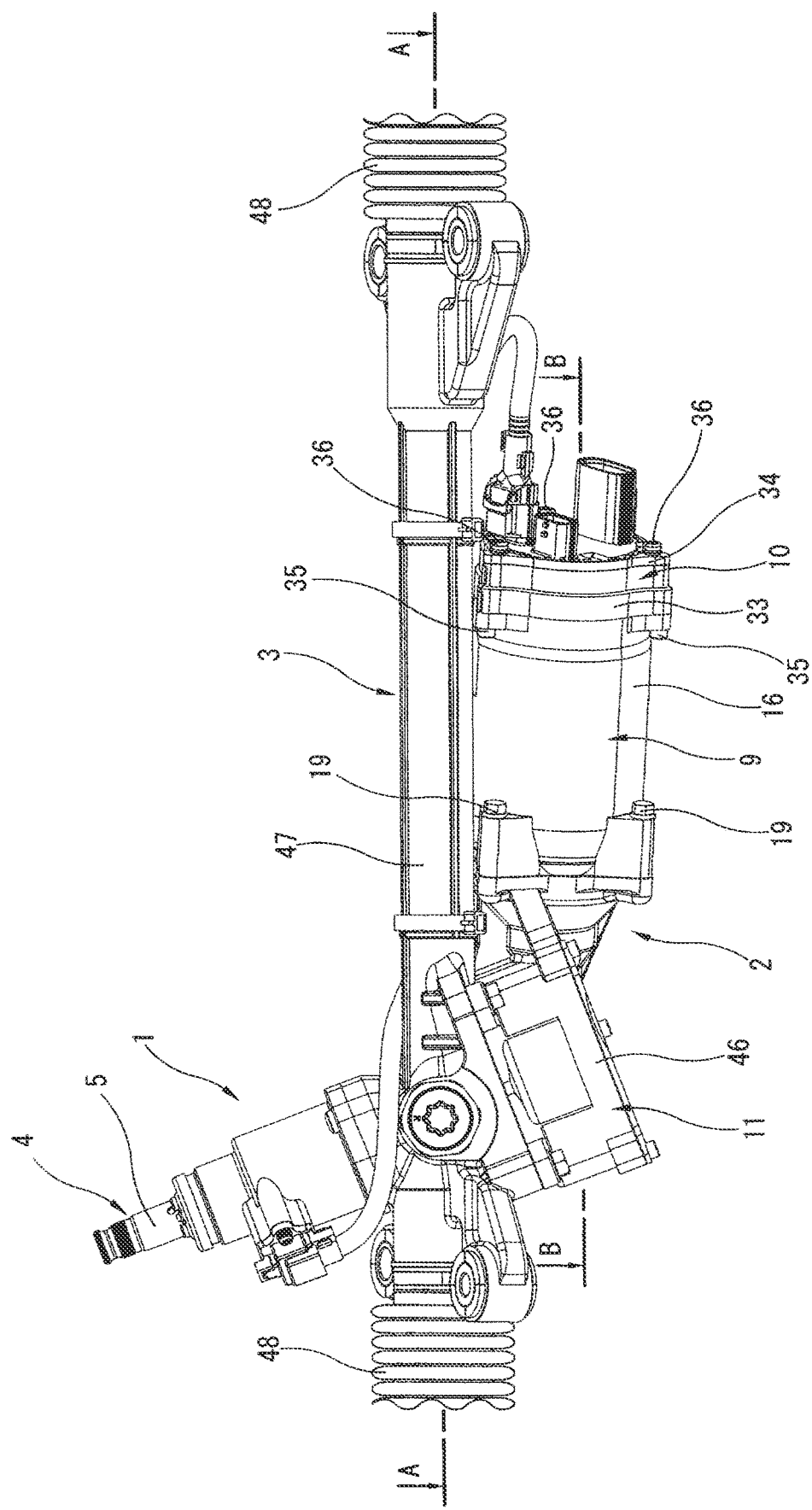
FIG. 1 is a front view of a power steering apparatus in a first preferred embodiment according to the present invention.
Figure 2:
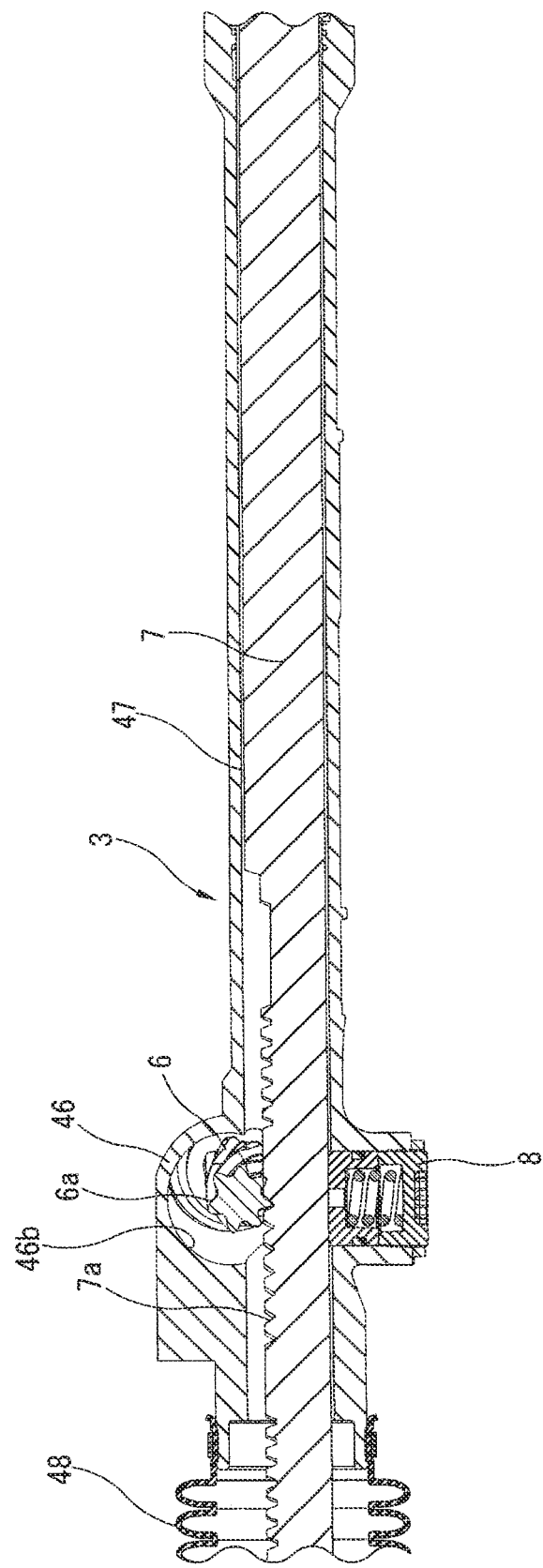
FIG. 2 is a longitudinal cross sectional view cut away along line A-A in FIG. 1.
Figure 3:
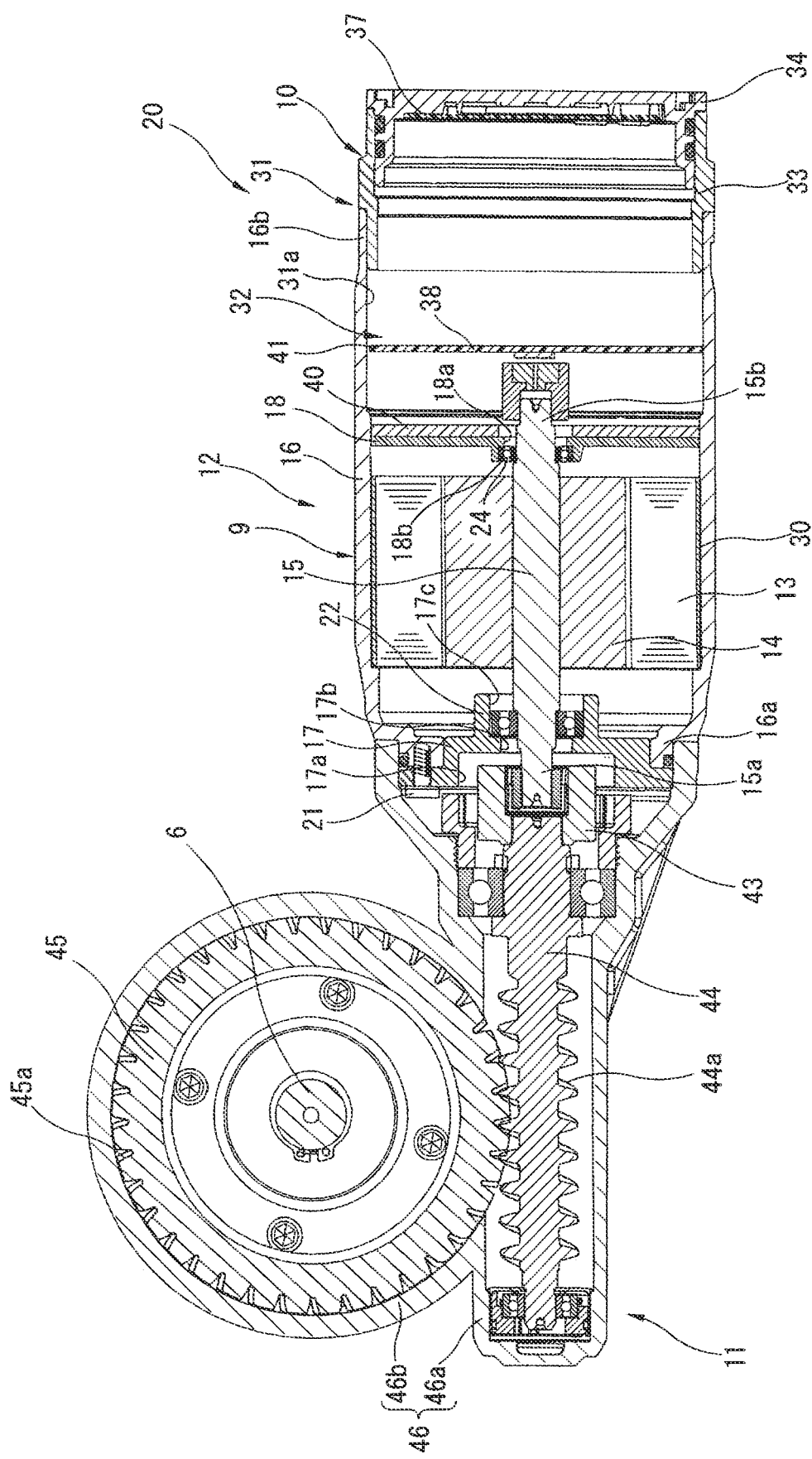
FIG. 3 is a longitudinal cross sectional view cut away along line B-B in FIG. 1

The power steering apparatus in the first preferred embodiment, as shown in FIGS. 1 through 3, includes: a steering mechanism 1 which transmits a rotation of a steering wheel (not shown) to steerable wheels (not shown); a steering assistance mechanism 2 which assists a steering operation of the driver by giving a steering assistance force to steering mechanism 1 based on a steering information or so forth; and a housing member 3 made of an aluminum alloy and housing at least one part of each of both mechanisms 1, 2 at an inside thereof.

Steering mechanism 1 is, as shown in FIGS. 1 and 2, so-called, a rack-and-pinion type steering mechanism and is mainly constituted by a steering shaft 4 including an input shaft 5 having one end side interlinked with the steering wheel so as to integrally be rotatable to the steering wheel and an output shaft 6 interlinked to the other side of input shaft 5 so as to be relatively rotatably via a torsion bar (not shown); and a rack bar 7 having rack teeth 7a meshed with an outer periphery of output shaft 6 to be moved axially. At both end sections of rack bar 7, the steerable wheels are interlocked via tie rods, knuckle arms, and so forth. In association with the axial movement of rack bar 7, the respective knuckle arms are pulled so that directions of respective steerable wheels are changed. It should be noted that a reference numeral 8 in FIG. 2 denotes a rack retainer which serves to make a meshing adjustment between rack bar 7 and output shaft 6.

Figure 4:
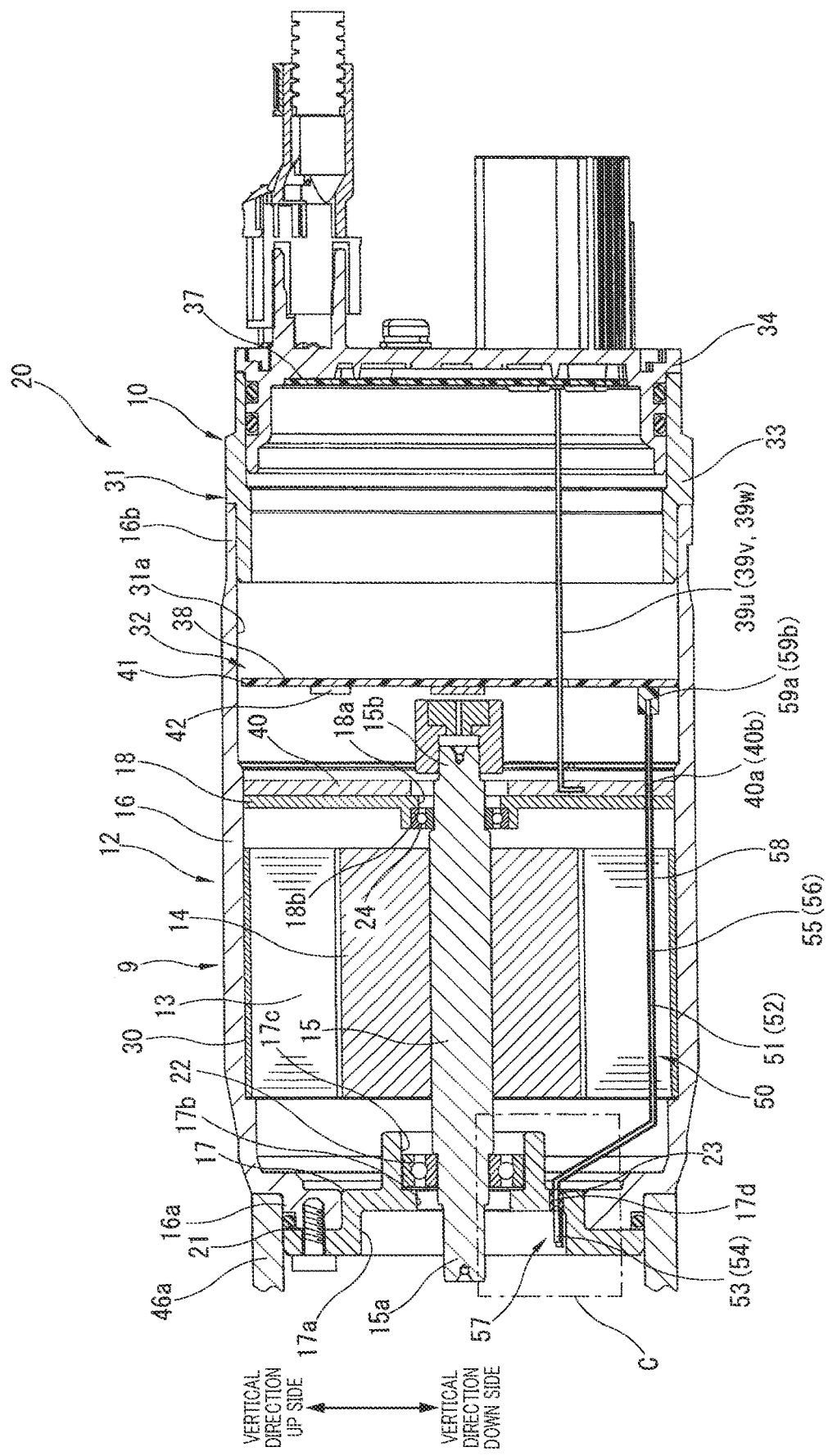
FIG. 4 is a longitudinal cross section view representing a cut of internal structures of an electrically driven motor and an ECU related to the first embodiment.

Steering assistance mechanism 2, as shown in FIGS. 1, 3, and 4, is mainly constituted by an electrically driven motor 9 which serves as a dynamic (power) source generating a steering assistance force; an ECU 10 which is a control unit serving to drivingly control electrically driven motor 9; and a worm gear 11 which is a reduction gear (or a speed reducer) to transmit a steering assistance force (a rotation force) outputted by electrically driven motor 9 to output shaft 6 while (a rotation speed of) the steering assistance force is reduced (decelerated).

Figure 5:
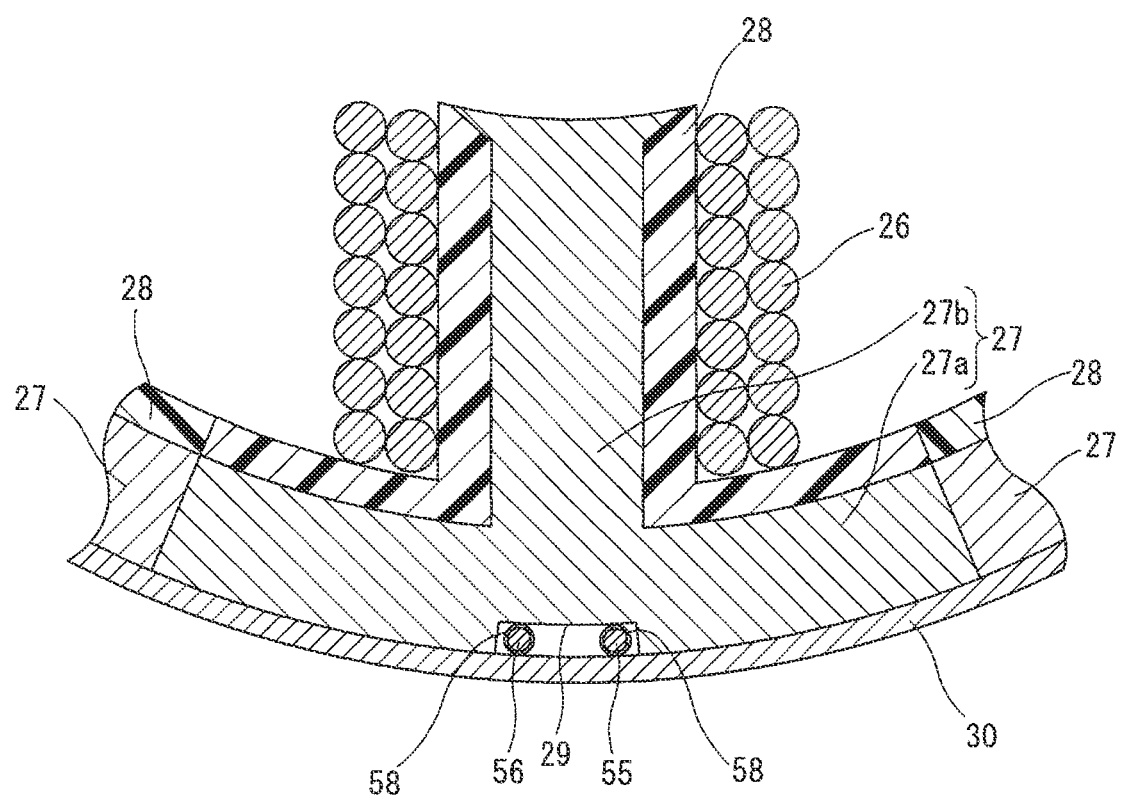
FIG. 5 is a longitudinal cross sectional view representing a stator of the electrically driven motor related to the first embodiment.

Electrically driven motor 9 is, as shown in FIGS. 3 through 5, so-called, a three-phase induction motor driven on a basis of a three-phase alternating current and includes: a motor housing section 12 constituting a part of housing member 3; a stator and a rotor 14, both of which are disposed in an inner part of motor housing section 12; and a drive shaft 15 which is integrally rotatable in association with the rotation of rotor 14.

Motor housing section 12 is, especially as shown in FIG. 4, mainly constituted by a substantially cylindrically shaped tubular section 16 within which stator 13 and rotor 14 are housed; a one side wall 17 which is a wall part enclosing one end opening of tubular section 16; and a partitioning wall 18 disposed at a substantial center position in the axial direction of drive shaft 15 of tubular section 16.

Tubular section 16 has one end section 16a whose diameter is formed in a smaller step difference diameter shape than the other positions of tubular section 16 and the other section 16a is engaged and fixed to the opening section by means of a bolt (refer to FIG. 1). The other end section 16a is engaged and fixed to the opening section by means of a bolt 19 (refer to FIG. 1) in a state in which one end section 16a is fitted into an opening end section of a warm shaft housing section 46a of warm gear 11 which will be described later.

In addition, tubular section 16 has a position of the other end side than partitioning wall 18 in the axial direction of drive shaft 15 constituting a part of ECU housing section 31 as will be described later. That is, motor housing section 12 and ECU housing 31 are integrally structured as a motor ECU housing section 20 by a share of tubular section 16.

One side wall 17 is formed in a substantially circular plate shape and is fixed with a bolt 21 to an end surface at one end section 16a of tubular section 16. In this one side wall 17, a wall section recessed section 17a in a circular recess shape is formed which opens toward warm gear 11 side in the axial direction of drive shaft 15.

In addition, a first penetrating hole 17b is penetrated through a center section of one side wall 17. One end section 15a of drive shaft 15 is inserted through first penetrating hole 17b. A substantially cylindrical first bearing section 17c is projected from one end surface of rotor 14 side. One end section 15a of drive shaft 15 is rotatably supported via a first ball bearing 22 housed in first bearing housing section 17c.

Furthermore, a penetrating hole 17d through which first and second electrodes 51, 52 of moisture detection sensor 50 are inserted is penetrated and formed along the axial direction of drive shaft 15.

This penetrating hole 17d has a cross section formed in a substantially eclipse shape and is located at a lower end section in a vertical direction of wall section recessed section 17a which provides the lower side in the vertical direction of wall section recessed section 17a than first ball bearing 22 of one side wall 17 and a second ball bearing 24 as will be described later. A grommet 23 which seals in a liquid tight manner between first and second electrodes 51, 52 and penetrating hole 17d is formed in a flat eclipse shape. This grommet 23 is made of a resin material or a rubber material and is formed in a flat eclipse shape.

Partitioning wall 18 is formed in a substantially circular plate shape and fixed to an inner periphery of tubular section 16 and a second insertion hole 18a through which other end section of drive shaft 15 is inserted at the center position thereof is penetrated and formed.

In addition, a second insertion hole 18a through which partitioning wall 18a through which other end section 15b of drive shaft 15 is inserted is penetrated and formed at a center position of tubular section 16. In addition, since a second bearing housing section 18b in a substantially cylindrical shape is projected and formed from an end surface of rotor 14 side, other end section 15b of drive shaft 15 is rotatably supported via a second ball bearing 24 housed in second bearing housing section 18b.

Stator 13 includes: a cylindrical stator core formed of a magnetic (property) material; and a coil 26 wound onto the stator core. The stator core is formed by a juxtaposition (an side-by-side arrangement in an annular shape) of a plurality of split cores 27 in a letter T shape shown in FIG. 5.

Each of split cores 27 is made by an overlap of a plurality of thin plates (a lamination) pressed by a press. Each of split cores 27 includes: an arc shaped core pack 27a extended along a circumferential direction of drive shaft 15; and a tooth 27b projected from an inner peripheral surface of each of core packs 27a. Coil 26 is wound around an outer peripheral surface of each of core packs 27a. In addition, a bobbin 28 formed of an electrically non-conductive resin material is attached on an inner peripheral surface of each of core packs 27a and an outer surface of tooth 27b. Coil 26 is electrically held and insulated with bobbin 28.

Furthermore, a stator core recessed section 29 is recessed in an elongate rectangular shape in cross section along an axial direction of drive shaft 15.

In addition, stator 13 is housed within motor housing section 12 in a state enclosed by means of a stator cover 30 formed in a substantially cylindrical shape by means of a metallic material.

ECU 10, especially as shown in FIG. 4, includes: an ECU housing section 31 constituting part of housing member 3; and a control circuit 32 housed in a control circuit housing section 31a formed at an inside of ECU housing section 31 and which serves to drivingly control electrically driven motor 9.

ECU housing section 31 is mainly constituted by tubular section 16 and partitioning wall 18 which are parts of motor housing section 12, a cylindrical casing member 33 fixed to the opening end of the other end side 16b of tubular section 16 with bolt 35 (refer to FIG. 1); and a cover member 34 fixed to an opening end opposite to tubular section 16 of casing member 33 and enclosing the opening end described above.

In addition, ECU housing section 31 is communicated with motor housing section 12 via second insertion hole 18a of partitioning wall 18.

Control circuit 32 is constituted by a board, a microcomputer, and so forth and includes: a power module 37 generating a three-phase alternating current electric power supplied from a battery (not shown) mounted in a vehicle; and a control module 38 which drivingly controls switching elements (not shown) as representative of MOS-FETs from power module 37.

Power module 37 is additionally attached onto the inner end surface of a cover member 34 having a heat sink function in ECU housing section 31. In addition, power module 37 has on its three electric current output terminals (not shown) outputting a three-phase alternating electric power generated by power module 37 on the board and each one terminal section of three bus bars 39u, 38v, 39w constituting a part of control circuit 32 is connected to each one end section.

Each bus bar 39u, 39v, 39w is in-molded within a resin-made bus bar mold member 40 which is adjoining arranged on an end surface at an ECU housing section 31 side of partitioning wall 18. In addition, each bus bar 39u, 39v, 39w is connected with a corresponding coil 26 of electrically driven motor 9 via each repeater terminal (not shown). The three-phase alternating electric current power generated by power module 37 is supplied to electrically driven motor 9.

Control module 38 is formed in such a way that conductor patterns (not shown) are formed on front and rear surfaces of board 41 made of an electrically non-conductive resin material as represented by a glass epoxy resin and is constituted by mounting a multiple number of electronic parts including microcomputer 42 on the conductive patterns.

Microcomputer 42 performs various processing such as arithmetic operations of a motor command signal related to the control of electrically driven motor 9 and a fail safe processing when an abnormality in the power steering apparatus occurs.

Worm gear 11, as shown in FIG. 3, includes: a worm shaft 44 connected integrally rotatably to one end section 15a of drive shaft 15 via an axial joint 43 and having an outer periphery of teeth section 44a of worm shaft 44; and a worm wheel 45 having a teeth section 45a formed on an outer periphery of worm wheel which is meshed with teeth section 45a of worm shaft 44; and a reduction gear er housing section 46 housing worm shaft 44 and a worm wheel 45 into the inside of the housing section 46.

Reduction gear housing section 46 is constituted by a worm shaft housing section 46a in a substantially bottomed cylindrical shape and in which warm shaft 44 is housed and a flat cylindrical worm wheel housing section 46b communicated with worm shaft housing section 46a and in which warm shaft 45 is housed in the inside thereof. In addition, an inner part of reduction gear housing section 46 is communicated with motor ECU housing section 20 connected to warm shaft housing section 46a via first penetrating hole 17b of one side wall 17.

Housing member 3, as shown in FIGS. 1 through 3, is mainly constituted by a rack bar housing section 47 at an inside of which a part of rack bar 7 is housed, reduction gear housing section 46 and motor ECU housing section 20 described hereinbefore.

An inner part of rack bar housing section 47 is formed so as to be communicated with the worm wheel housing section of reduction gear housing section 46 as shown in FIG. 2. Thus, housing member 3 is communicated with all of rack bar housing section 47, reduction gear housing section 46, and motor ECU housing section 20 via inner spaces thereof.

In addition, concerning rack bar housing section 47, both end sections of rack bar housing section 47 in the axial direction are opened respectively. Each of boots 48 formed in a bellows shape and formed of a resin material is attached onto a corresponding one of the end sections of rack bar housing section 47 and the invasion of moisture such as rain water into housing member 3 is suppressed.

Then, moisture detection sensor 50 is disposed in the inner part of housing member 3 to detect the moisture when moisture is invaded into the inside of housing member 3.

This moisture detection sensor 50 detects the invasion of moisture (liquid substance) into the inner part of the housing member 3 when water (liquid) (or moisture) is invaded into housing member 3 on a basis of the detection of moisture within worm shaft housing section 46a. As shown in FIG. 4, pair of first and second electrodes 51, 52, each of first and second electrodes 51, 52 substantially formed in a columnar bar shape of an electrically conductive material, mainly constituting moisture detection sensor 50.

A major part of each of first and second electrodes 51, 52 is housed within motor ECU housing section 20. One end section of ECU 10 side electrode is electrically connected to control circuit 32 and the other end section of ECU 10 side electrode is projected into worm shaft housing section 46a penetrated through penetrating hole 17d formed on the one side wall 17.

These respective projection sections function as first and second moisture detection sections 51, 52 which serve as the moisture detection.

In other words, first and second electrodes 51, 52 include: first and second moisture detection sections 53, 54 disposed within worm shaft housing section 46a and which serve to detect moisture at the inside of housing member 3; and first and second transmission sections 55, 56 which transmit the transmission of the electrical signal between respective control circuits 32 and respective moisture detection sections 53, 54 from respective moisture detection sections 53, 54 via penetrating holes 17d.

Figure 6:
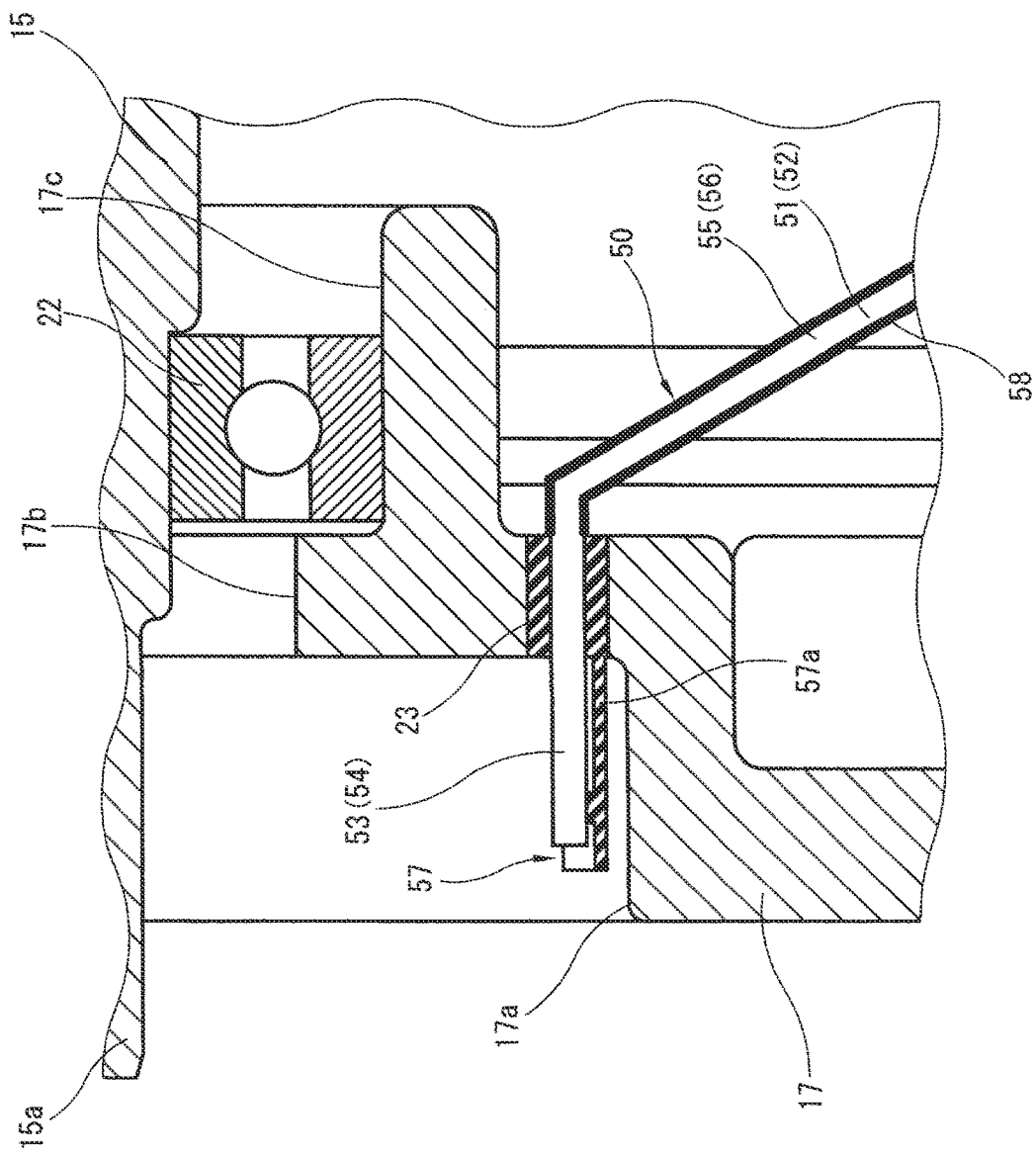
FIG. 6 is an expanded cross sectional view representing an expanded index line of C section in FIG. 4.
Figure 7:
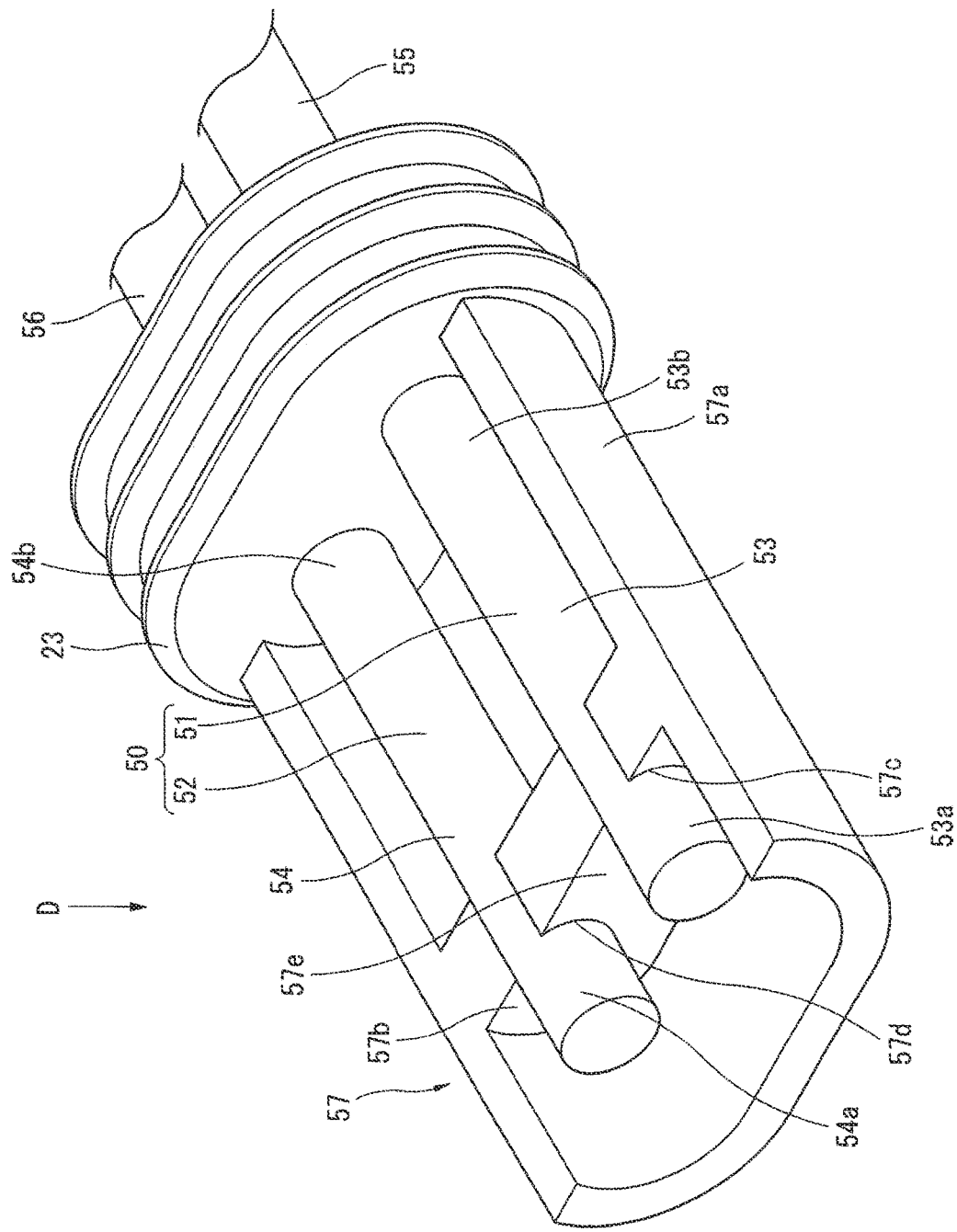
FIG. 7 is a perspective view representing a moisture detection sensor, a grommet, and moisture receiving section in the first embodiment.

As shown in FIG. 6, first and second moisture detection sections 53, 54 are arranged at a vertical direction lower side than first and second ball bearings 22, 24 from the positional relationship of penetrating hole 17d.

Figure 8:
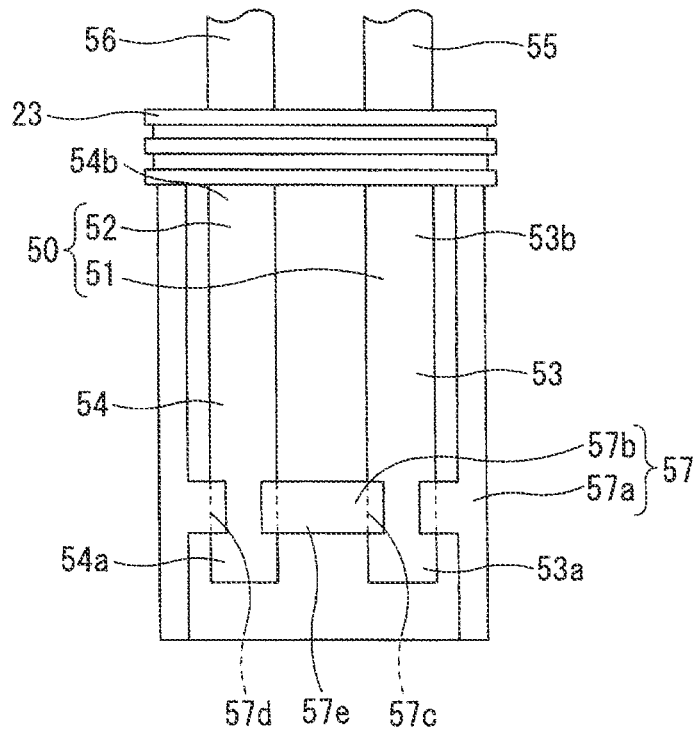
FIG. 8 is a detailed drawing viewed from a direction of D.

In addition, first and second moisture detection sections 53, 54 are formed in straight line shapes, as shown in FIGS. 6 and 8, and are arranged within worm shaft housing section 46a in a non-contact state in which first and second moisture detection sections 53, 54 are mutually in substantially parallel to each other and mutually spaced apart from each other.

Furthermore, a moisture receiving section 57 is disposed at the lower side in the vertical direction of first and second moisture detection sections 53, 54 which retain the moisture invaded into worm shaft housing section 46a.

This moisture receiving section 57 is integrally formed with respect to grommet 23. This moisture receiving section 57 includes: a letter U shaped holding section 57a projected along the axial direction of drive shaft 15 from an end surface at a worm shaft housing section 46a of grommet 23 and opened toward an upper side in the vertical direction; and a dam section 57b and opened toward an upper side in the vertical direction to dam moisture dropped down into holding section 57a disposed at a tip side (an anti-grommet 23 side) of holding section 57a.

Holding section 57a is disposed at a position slightly spaced apart from a lower section of an inner peripheral surface in the vertical direction of first and second peripheral surfaces of wall section recessed section 17a of one side wall 17. In addition, at least one part of each of first and second moisture detection sections 53, 54 is housed at an inside of holding section 57a. When the quantity of moisture dropped down into first and second moisture detection sections 53, 54 is housed in the inside of holding section 57a becomes equal to or greater than a predetermined moisture, first and second moisture detection sections 53, 54 are electrically conducted to each other via the moisture.

Dam section 57a is formed with first and second moisture receiving section side engagement sections 57c, 57d in arc shaped groove shapes respectively engaged with tip sections 53a, 54a of first and second moisture detection sections 53, 54. These first and second moisture receiving section side engagement sections 57c, 57d are mutually spaced apart from each other in a radial direction thereof. When first and second moisture detection sections 53, 54 are engaged with each other, first and second moisture detection sections 53, 54 are spaced apart from each other.

That is, in this embodiment, a thickness section between first moisture receiving section side engagement section 57c and second moisture receiving section 57d, in dam section 57b, is disposed between first and second moisture detection sections 53, 54 and is constituted by a spacer section 57e which functions as a spacer member for first and second moisture detection sections 53 and 54 to be spaced apart by a predetermined distance.

First and second transmission sections 55, 56 are, as shown in FIG. 4, formed so as to extend from first and second moisture detection sections 53, 54 while being appropriately bent through the inner part of motor housing section 12 from first and second moisture detection sections 53, 54. Outer peripheral sections of first and second transmission sections 55, 56 in a range of first and second transmission sections 55, 56 which is disposed within motor housing section 12 are covered with insulating materials, respectively.

In addition, each of first and second transmission sections 55, 56 has at least a part of positions at which each of first and second transmission sections is overlapped with stator 13 and is housed between a stator core recessed section 29 and a stator cover 30, both of which constituting electrically driven motor 9.

Furthermore, first and second transmission sections 55, 56 are, as shown in FIG. 4, in-molded into first and second transmission section holding holes 40a, 40b which are transmission section holding section side engagement sections integrally formed with a bus mold members 40 at at least one part of which first and second transmission sections 55, 56 are overlapped with bus mold member 40, as shown in FIG. 4.

In addition, first and second transmission sections 55, 56 are held by and is electrically connected to control circuit 32 in such a way that each one end section extended toward control circuit housing section 31a is inserted into board 41 of control circuit 32 along the axial direction of drive shaft 15 disposed in board 41 of control circuit 32.

It should be noted that control circuit 32 outputs the electrical signal to one of moisture detection sections 53, 54 at all times or for each constant period, monitors the other of the moisture detection sections, and determines that the moisture is invaded into the inside of housing member 3 by the input of the electrical signal from the other moisture detection section.

More specifically, after the invasion of the moisture into the inner part of housing member 3 from a breakage position with, for example, boot 48 broken, this moisture reaches the inside of worm shaft housing section 46 and is dropped down to moisture receiving section 57. At this time, since both moisture detection sections 53, 54 which are, at an ordinary time, maintained in an electrically non-conductive state due to a separation of both moisture detection sections 53, 54 therebetween provide a moisture detection state in which both moisture detection sections are electrically conducted via moisture. Then, an electrical signal outputted to first moisture detection section 53 via first transmission section 55 from control circuit 32 is inputted into control circuit 32 via second transmission section 56.

Furthermore, when control circuit 32 detects moisture of the inner part of housing member 3 through moisture detection sensor 50, control circuit 32 has an abnormality responding section 60 which performs various abnormality responding procedures determining that an abnormality in the power steering apparatus occurs.

Figure 9:
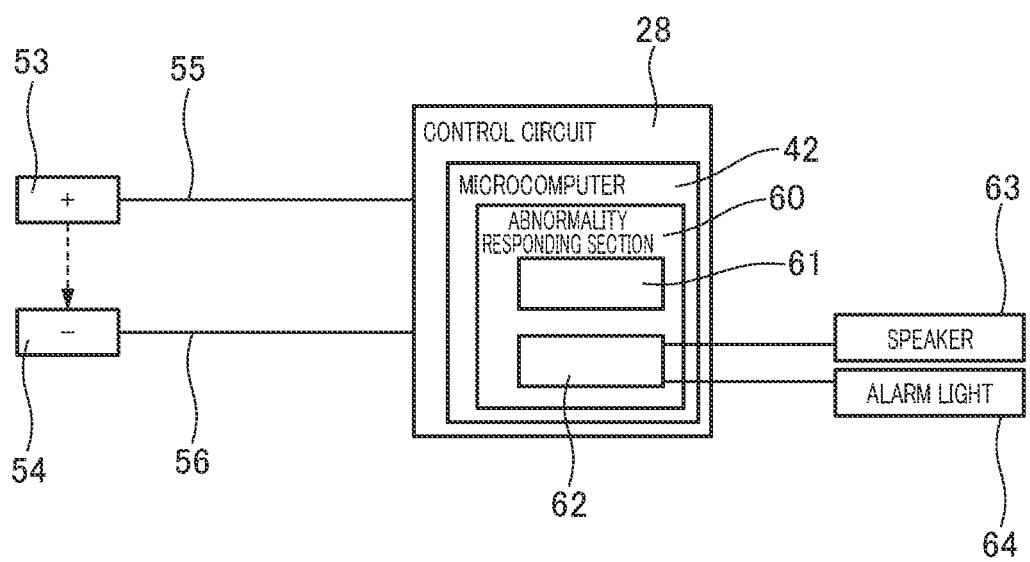
FIG. 9 is a block diagram representing a rough view of a moisture detection process and an abnormality determination process by a control circuit in the first embodiment.

This abnormality responding section 60 is disposed in control circuit 32 as a software within microcomputer 42. As shown in FIG. 9, abnormality responding section 60 includes: a storing section 61 which stores the information on the moisture detection by means of moisture detection sensor 50; and an alarm signal outputting section 62 which outputs an alarm signal to a speaker 63 mounted in the vehicle or an alarm light 64 disposed in an instrument panel (not shown) of the vehicle.

While speaker 63 issues an alarm sound when the alarm signal is inputted from an alarm signal outputting section 62, alarm light 64 is illuminated upon receipt of the alarm signal from alarm signal outputting section 62. Attention has been paid to the driver in either case.

(Action and Effect of the First Embodiment)

Hence, according to the power steering apparatus structured as described hereinabove, moisture detection sensor 50 discovers the invasion of moisture into the inner part of housing member 3 at an early timing and abnormality responding section 60 of control circuit 32 serves to pay attention to the driver so that the driver can promote a countermeasure such as a repair or so forth.

Incidentally, in a case where, in the power steering apparatus in this embodiment in which each of constituents of housing member 3 such as rack bar housing section 47, reduction gear housing section 46, and so forth is communicated with one another via their inner parts, moisture is invaded from a breakage position due to the breakage of one or each of boots 48, there is a possibility that this invaded moisture reaches control circuit housing section 31a of ECU housing section 31 from the breakage position of one of each of boots 48 via a series of invasion passages of rack bar housing section 47, worm wheel housing section 46b, worm shaft housing section 46a, motor housing section 12, and ECU housing section 31 in this order. Then, when the invaded moisture to the inside of control circuit housing section 31a touches control circuit 32, an unintended short circuiting in control circuit 32 via moisture occurs. Thus, there is a possibility of occurrence of an abnormality such as an erroneous operation mode or so forth in control circuit 32.

To cope with this occurrence, in this embodiment, first and second moisture detection sections 53, 54 of moisture detection sensor 50 are arranged in worm shaft housing section 46a which is located at an more upstream side than ECU housing section 31. Thus, the invade moisture can be detected by moisture detection sensor before the arrival of the invade moisture at the inside of ECU housing section 31. Hence, the unintended short circuiting or so forth in control circuit due to the invasion of moisture can be suppressed and the occurrence of abnormality in control circuit 32 can be suppressed.

In addition, connection of first and second moisture detection sections 53, 54 of moisture detection sensor 50 with control circuit 32 is carried out first and second transmission sections 55, 56 disposed in the inside of motor ECU housing section 20 which is the inside of housing member 3. Thus, the invasion of moisture into the inside of motor ECU housing section 20 via the transmission section such as a harness and so forth which has provided anxiety in the conventional steering apparatus in which the transmission section such as the harness or so forth is arranged at an outside of housing member 3 can be suppressed. Then, due to this countermeasure described above, the occurrence of the erroneous operation mode or so forth of control circuit 32 can be suppressed.

Incidentally, when the action and effect described above are obtained, it is possible to constitute one side of motor ECU housing section 20 which is nearer to warm shaft housing section 46a as an ECU housing section 31 and another side of motor ECU housing section 20 which is far away from worm shaft housing section 46a as a motor housing section 12. In this structure, since first and second moisture detection sections 53, 54 are adjoined with respect to control circuit 32, the connection between each moisture detection sections 53, 54 and control circuit 32 is easily carried out. On the other hand, there is a possibility that an arrangement position and a shape of board 41 constituting control circuit 32 are limited by the penetration of drive shaft 15 of electrically driven motor 9 through control circuit 32 within ECU housing section 31.

Whereas, in this embodiment, one side of motor ECU housing section 20 which is nearer to worm shaft housing section 46a is motor housing section 12 and another side of ECU housing section 31 which is remote from worm shaft housing section 46a is the ECU housing section 31. Hence, no interference between drive shaft 15 of electrically driven motor 9 and control circuit 32 occurs. Consequently, a limitation of the arrangement position and shape of board 41 or so forth of control circuit 32 is relieved and a degree of freedom of a layout can be improved.

In addition, in this embodiment, an outer peripheral section of first and second transmission sections 55, 56 in a range disposed within motor housing section 12 is covered with insulation material 58. Hence, the short circuiting between electrically conductive components within first and second transmission sections 55, 56 is suppressed. Hence, it becomes possible to suppress the erroneous operation and so forth of moisture detection sensor 50 in association with the short circuiting.

Furthermore, in this embodiment, first and second transmission sections 55, 56 are housed and arranged in the inside of stator core recess section 29 which is previously formed in stator 13 in a range in which first and second transmission sections 55, 56 are overlapped. A large sizing in a radial directional size of motor housing section 12 can be suppressed.

Still furthermore, in this embodiment, one side wall 17 is formed separately from tubular section 16 as an independent body. Before the assembly of one side wall 117, the arrangement position of moisture detection sections 53, 54 of moisture detection sensor 50 can easily visually be recognized. Therefore, a positioning when first and second moisture detection sections 53, 54 are inserted into penetrating hole 17d of one side wall 17 becomes easy so that an assembly capability (manufacturability) of moisture detection sensor 50 with respect to the power steering apparatus can be improved.

Another still furthermore, in this embodiment, first and second transmission sections 55, 56 are arranged within stator cover 30. Hence, when various kinds of motor components such as stator cover 30, stator 13, rotor 14, and so forth are assembled, such an assembly method that, with respective transmission sections 55, 56 assembled, the respective motor components are incorporated into motor housing section 12 can be adapted. As compared with a case where first and second transmission sections 55, 56 are assembled within motor housing section 12 in which the motor constituting elements are already housed, an assembly operation can easily be carried out.

In addition, in this embodiment, moisture receiving section 57 is disposed at the lower side in the vertical direction of first and second moisture detections 53, 54 and a part of each of first and second moisture detection sections 53, 54 is housed within holding section 57a of moisture receiving section 57. Thus, even though a large quantity of moisture is not invaded into the inner part of housing member 3 (worm shaft housing section 46a), several drops of moisture are dropped down in holding section 57a of moisture receiving section 57. At this time, the electrical conduction between first moisture detection section 53 and second moisture detection section 54 can sufficiently be carried out. Therefore, the moisture detection through moisture detection sensor 50 can be carried out at the earlier timing.

Furthermore, in this embodiment, moisture receiving section 57 is integrally formed with grommet 23. Hence, an increase in the numbers of components can be suppressed. Consequently, a simplification of the structure of the power steering apparatus described above can be achieved.

Furthermore, in this embodiment, moisture receiving section 57 is arranged at the lower section in the vertical direction within wall section recess section 17a of one side wall 17. Hence, even if moisture receiving section 57 and grommet 23 were dropped toward the lower direction in the vertical direction, they would be held by a lower section of an inner peripheral side of wall section recess section 17a. Hence, the above-described actions and effects according to the installation of moisture receiving section 57 can continuously be obtained.

Furthermore, in this embodiment, first and second moisture receiving section side engagement sections 57c, 57d are disposed in which first and second moisture receiving section side engagement side engagement sections 57c, 57d are inserted from the axial direction and engaged to dam section of moisture receiving section 57. Moisture detection sensor 50 and moisture receiving section 57 are assembled in a simple structure.

In addition, in this embodiment, first and second transmission sections 55, 56 are held according to a simple structure such as first and second transmission section holding section holding holes 40a, 40b integrally formed to bus mold member 40. Hence, each transmission section 55, 56 can be assembled to the power steering apparatus without introduction of the complication of the power steering apparatus.

Especially, in this embodiment, first and second transmission sections 55, 56 are previously in-mold formation to bus bar mold member 40. Hence, since a process step of assembly of each of first and second transmission members 55, 56 to bus bar mold member 40 is naturally unnecessary, an assembly operability can further be improved.

In addition, in this embodiment, first and second moisture detection sections 53, 54 are arranged at the lower side in the vertical direction than first and second ball bearings 22, 24. Hence, moisture invaded into housing member 3 can be detected before the arrival of the invaded moisture at respective ball bearings 22, 24. Consequently, a generation of rust or so forth of ball bearings 22, 24 can be suppressed.

Furthermore, in this embodiment, connector sections 59a, 59b are disposed on board 41 of control circuit 32. Hence, it becomes possible to connect between each of first and second transmission section 55, 56 and control circuit 32 easily and accurately only by an insertion operation of first and second transmission sections 55, 56 into connector sections 59a, 59b.

In addition, in this embodiment, first and second moisture detection sections 53, 54 are spaced apart from each other by a predetermined distance through a spacer section 57e (a thickness section between first and second moisture receiving section side engagement sections 57c, 57d) of moisture receiving section 57. Hence, a direct short circuiting between first moisture detection section 53 and second moisture detection section 54 can be suppressed and an erroneous moisture detection of moisture detection sensor 50 based on the short circuiting can be suppressed.

Second Embodiment

Figure 10:
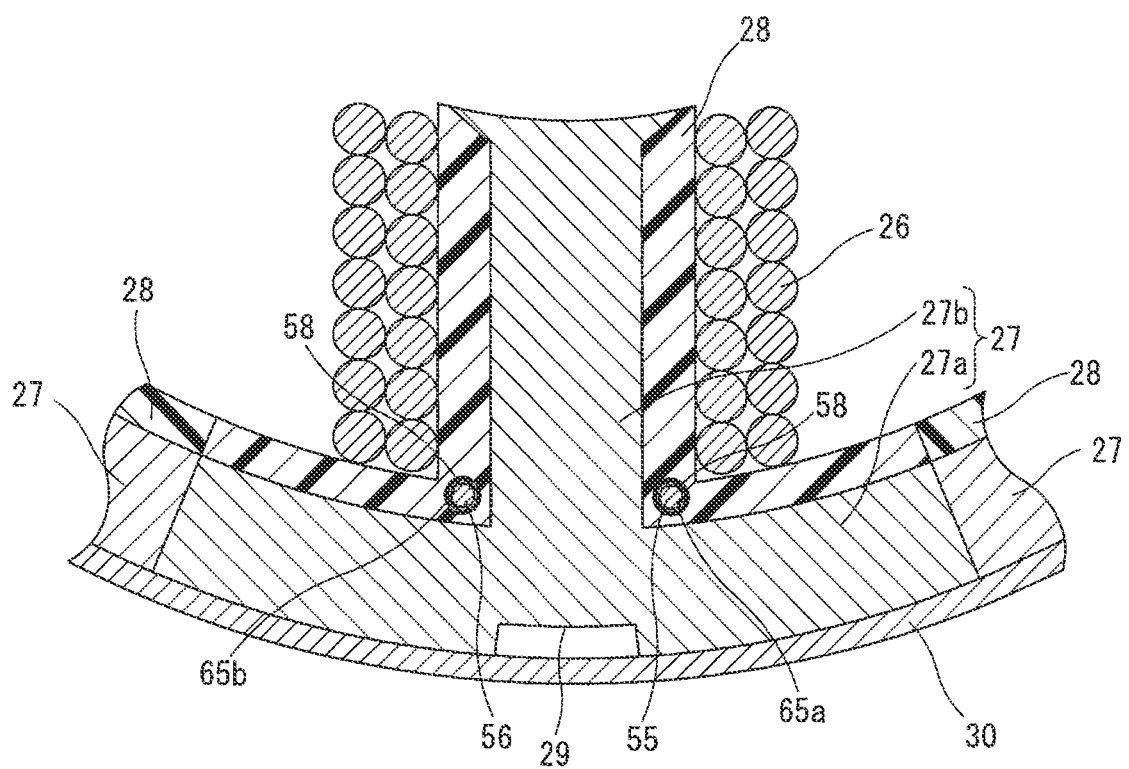
FIG. 10 is a longitudinally cross sectioned view representing a stator in a second preferred embodiment according to the present invention.

FIG. 10 shows a second preferred embodiment according to the present invention. A basic structure of the second embodiment is the same as the first embodiment. However, insertion locations of first and second transmission sections 55, 56 in a range in which first and second transmission sections 55, 56 are overlapped with stator 13 are modified.

That is, through each of bobbins 28 in the second embodiment, first and second bobbin side engagement holes 65a, 65b of circular shapes in cross section which are bobbin side engagement sections are penetrated and formed. First and second transmission sections 55, 56 are held by an insertion of first and second transmission sections 55, 56 into respective bobbin side engagement holes 65a, 65b and the engagements of these transmission sections 55, 56 with the respective bobbin side engagement holes 65a, 65b are carried out.

Hence, in the second embodiment, even in the range of first and second transmission sections 55, 56 in which they are overlapped with stator 13, first and second transmission sections 55, 56 are stably held by first and second bobbin side engagement holes 65a, 65b. Therefore, the holding capability of first and second transmission sections 55, 56 can further be improved.

In addition, since bobbin side engagement sections are disposed as first and second bobbin side engagement side engagement holes 65a, 65b which are penetrated holes, a radial directional size of motor housing section 12 is not large when first and second transmission sections 55, 56 are engaged with bobbin 28.

Third Embodiment

Figure 11:
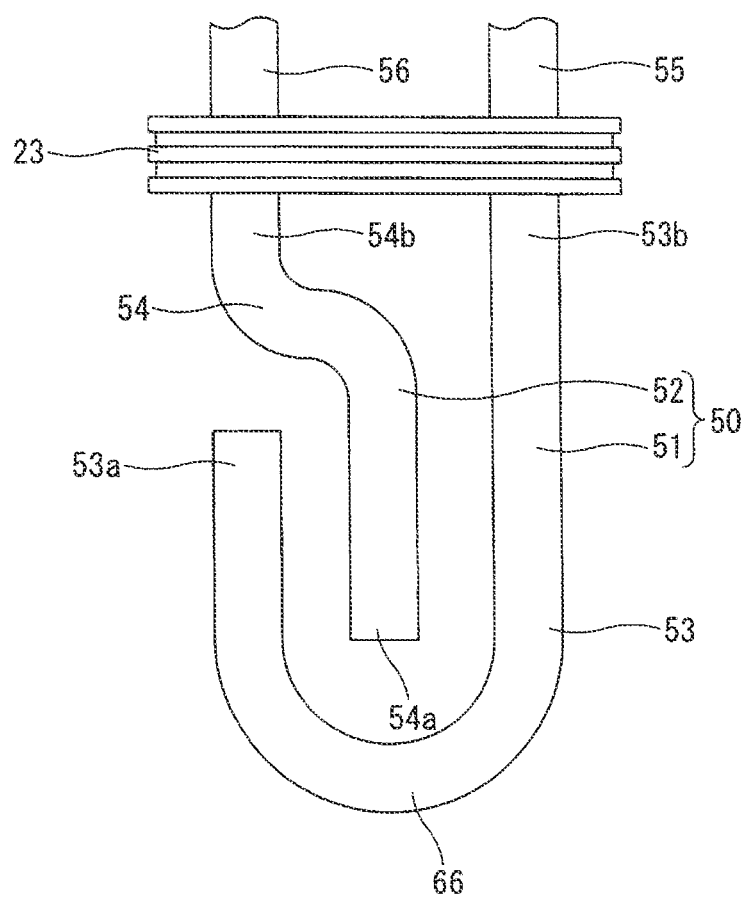
FIG. 11 is a plan view representing a moisture detection sensor and a grommet related to a third preferred embodiment according to the present invention.

FIG. 11 shows a third preferred embodiment according to the present invention. The basic structure is the same as the first preferred embodiment. However, moisture receiving section 57 in the first embodiment is abolished and the shapes of first and second moisture detection sections 53, 54 in moisture detection sensor 50 are modified.

That is, first moisture detection section 53 in the third embodiment is formed in a relatively elongated shape (size) with respect to second moisture detection section 54 and has a bending section 66 at a predetermined position of a tip section 53a side projected in a forward direction than second moisture detection section 54.

This bending section 66 is bent and formed in substantially semi-arc shape (a letter U shape as viewed from a plan direction in order for tip section 53a of first moisture detection section 53 to be folded in a backward direction by substantially 180 degrees with respect to second moisture detection section 54.

In addition, second moisture detection section in this embodiment is bent in a crank shape in order for base section 54b to approach base section 53b of first moisture detection section 53 and tip section 54a is engageably inserted in a space between opposing surfaces of bending section 66 of first moisture detection section 53.

Such moisture detection sensor 50 as used in this embodiment increases a region of respective outer peripheral surfaces of first and second moisture detection sections 53, 54 which approach to each other and mutually oppose against each other and electrical conduction via moisture is made easier to be carried out. Thus, moisture detection capability can be improved. However, if respective moisture detection sections 53, 54 are formed merely in straight shapes and in the elongated shapes in order to increase the above-described region, the large sizing in the axial direction of moisture detection sensor 50 and there is a possibility of introduction of interference or so forth to other members in association with the large sizing.

Whereas, in this embodiment, bending section 66 is disposed at tip section 53a side of first moisture detection section 53 and tip section 54a of second moisture detection section is engageably inserted into the space between mutually opposing surfaces of bending section 66 so that the above-described region is increased. Thus, while the large sizing in the axial direction of moisture detection sensor 50 is suppressed, the moisture detection capability can effectively be improved.

It should be noted that, in this embodiment, while bending section 54a is disposed on first moisture detection section 53, tip section 54a is engageably inserted into the space between the opposing surfaces of bending section 66 in order to expand the region described above. Alternatively, the region described above may be expanded by the installation of bending section 66 on second moisture detection section 54 and the engageably insertion of tip section 53a of first moisture detection section 53 into the space between the opposing surfaces of bending section.

Fourth Embodiment

Figure 12:
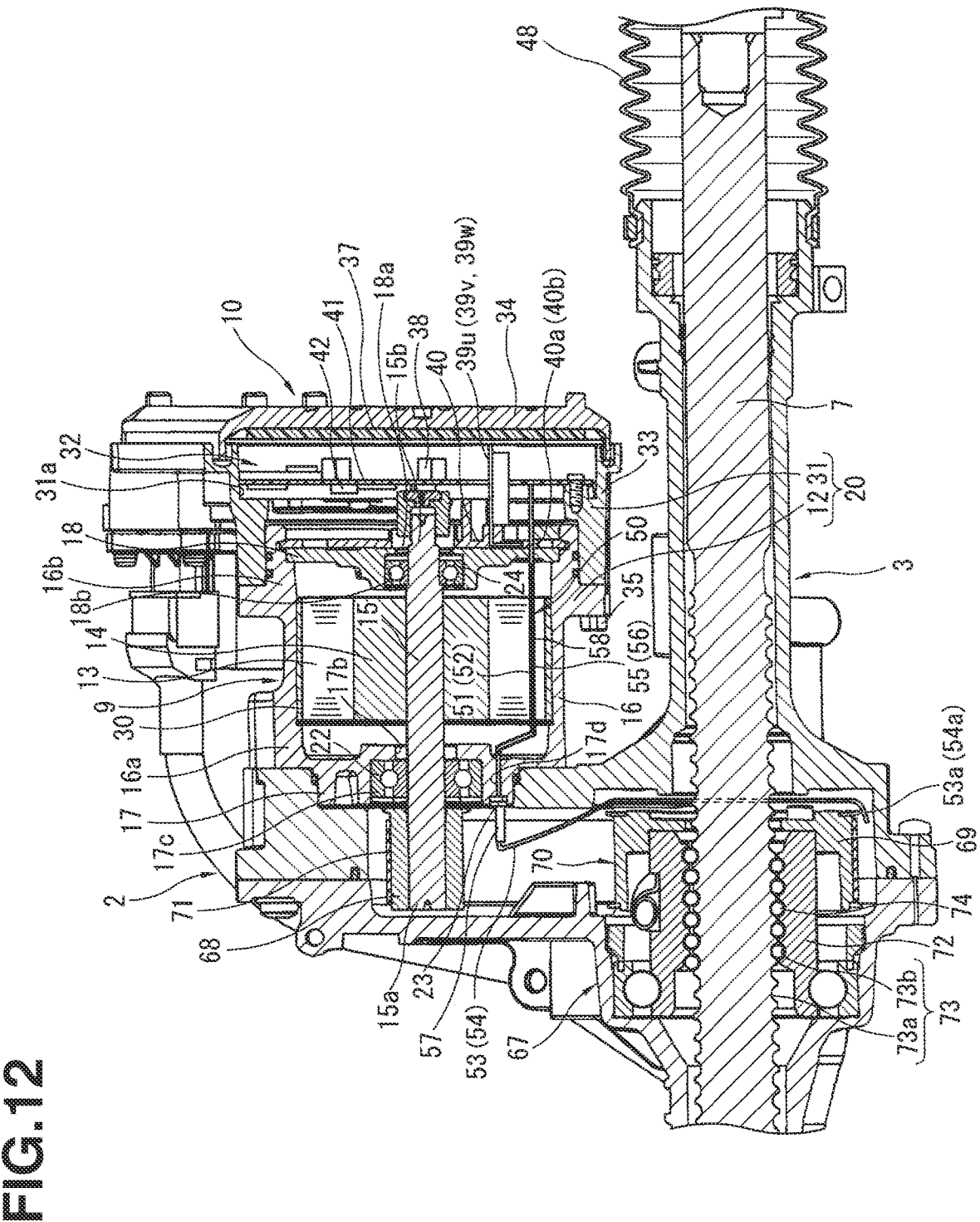
FIG. 12 is a longitudinally cross sectional view of the power steering apparatus in a fourth preferred embodiment according to the present invention.
Figure 13:
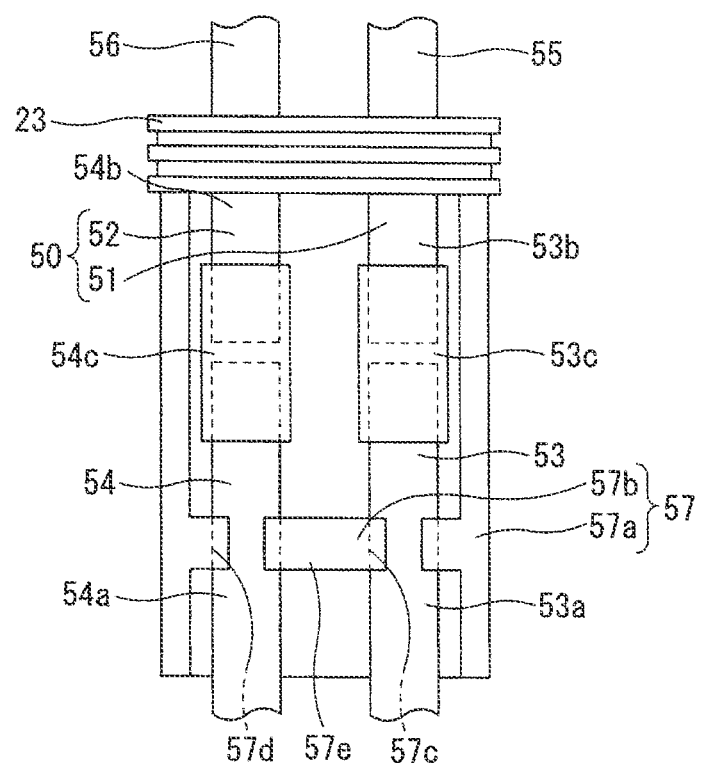
FIG. 13 is a longitudinally cross sectional view representing a moisture detection sensor, a grommet, and a moisture receiving section in the fourth preferred embodiment according to the present invention.

A fourth preferred embodiment shown in FIGS. 12 and 13 is an application of the present invention to a, so-called, belt drive type power steering apparatus.
It should, herein, be noted that constituent parts equivalent to or corresponding to those described in the first embodiment are designated as like reference numerals and specific explanations of these parts and positions will hereinafter be omitted.

That is, in the power steering apparatus in this embodiment, the reduction gear constituting steering assistance mechanism 2 is largely different from the respective embodiments. This reduction gear (or a speed reducer) 67, as shown in FIG. 12, is mainly constituted by an input pulley 68 which is disposed integrally rotatably onto an outer peripheral side of one end section 15a of drive shaft 15 of electrically driven motor 9 and rotates with an axis line of drive shaft 15 as a center, an output pulley 69 which is relatively rotatably disposed on an outer peripheral side of rack bar 7 and rotates on a basis of a rotational force of input pulley 68 and rotates with the axis line of rack bar 7, a ball screw mechanism 70 intervened between output pulley 69 and rack bar 7 and which converts the rotation of output pulley 69 into an axially directional movement of rack bar 7 while the rotation of output pulley 69 is decelerated, and a belt 71 wound across both of input and output pulleys 68, 69 and which serves to perform a synchronous rotation with both pulleys 68, 69 by a transmission of the rotation of input pulley 68 to output pulley 69.

Ball screw mechanism 70 includes: a nut, formed in a tubular shape embracing rack bar 7, disposed relatively rotatably with respect to rack bar 7, and made of an iron-based metallic material; a ball circulation groove 73 constituted by a spirally shaped axis side ball screw groove 73a disposed on the outer periphery of rack bar 7 and a spirally shaped axis side ball screw groove 73b disposed on an inner periphery of nut 72; a plurality of balls 74 rollably disposed within ball circulation groove 73; and a circulation mechanism (not shown) which circulates each ball 74 from one end side of ball circulation groove 73 to the other end side thereof.

In addition, tubular section 16 and one side wall 17 are integrally formed in motor housing section 12 connected to reduction gear housing section 46 in this embodiment and a first bearing housing section 17c which houses first ball bearing 22 in place of an abolishment of wall section recess section 17a is recessed in one end surface of one side wall 17 located at reduction gear housing section 46 side.

Furthermore, moisture detection sensor 50 in this embodiment is disposed in order for respective moisture detection sections 53, 54 to reach a lowest section in the vertical direction within reduction gear housing section 46 formed in an elongation shape in the vertical direction.

Specifically, respective moisture detection sections 55, 56 in this embodiment, as shown in FIG. 13, include: substantially straight line shaped base sections 53b, 54b disposed so as to extend from respective transmission sections 55, 56 sides toward reduction gear housing section 46 side; and tip sections 53a, 54b connected to respective base sections 53b, 54b via connection members 53c, 54c made of conductive materials. These respective tip sections 53a, 54a are extended to the lowest section in the vertical direction within reduction gear housing section 46 while bypassing rack bar 7 and ball screw mechanism 70.

In addition, respective transmission sections 55, 56 in this embodiment are directly connected to control circuit 32 without intervention of connector sections 59a, 59b.

Hence, since, in the power steering apparatus in this embodiment, first and second moisture detection sections 53, 54 are arranged in worm shaft housing section 46a in the same way as the first embodiment, moisture detection sensor 50 can detect moisture invaded into the inner part of housing member 3 before moisture reaches the inside of motor ECU housing section 20. Hence, the unintended short circuiting or so forth of control circuit 32 due to the invasion of moisture can be suppressed and the generation of the erroneous operation mode in control circuit 32 can be suppressed. In addition, the connection between first and second moisture detection sections 53, 54 and control circuit 32 is carried out using first and second transmission sections 55, 56 disposed in the inside (inner part) of motor ECU housing section 20 which is the inner part (inside) of housing member 3. Thus, the invasion of moisture within respective transmission sections 55, 56 is suppressed and this can also suppress the generation of the erroneous operation mode or so forth of control circuit 32.

Incidentally, if, in the power steering apparatus having ball screw mechanism 70 at the inside of housing member 3, a large quantity of moisture is resided (or reserved) for a long period of time, moisture is invaded within ball screw mechanism 70 so that the generation of rust is generated on nut 72 of ball screw mechanism 70, on respective balls 74, and so forth is suppressed. Consequently, an increase in a steering load can be suppressed.

However, in this embodiment, tip sections 53a, 54a of respective moisture detection sections 53, 54 are disposed in order for tip sections 53a, 54a to reach the lowest section in the vertical direction of the inner part of reduction gear housing section. Hence, before the moisture invaded in the inside of housing member 3 reaches the inside of ball screw mechanism 70, moisture detection sensor 50 can detect the invasion of moisture. Thus, the generation of rust on nut 72 of ball screw mechanism 70, respective balls 74, and so forth is suppressed so that the increase in a steering load can be suppressed.

In addition, in this embodiment, tip sections 53a, 54a of respective moisture detection sections 53, 54 and base sections 53b, 54b are respectively split into two. Hence, an assembly operation can be carried out in a sequence such that, after respective base sections 53b, 54b and transmission sections 55, 56 are attached onto motor housing section 12, tip sections 53a, 54a are connected to respective base sections 53b, 54b projected from penetrating hole 17d of one side wall 17. Thus, such a time consuming operation that elongate tip sections 53a, 54a are inserted through penetrating hole 17d can be omitted so that an easiness in assembling moisture detection sensor 50 can be improved.

Furthermore, since, in this embodiment, first and second transmission sections 55, 56 are directly connected to board 41. Hence, connector sections 59a, 59b in the first embodiment become unnecessary. Consequently, number of parts of the power steering apparatus can be reduced and a more simplification of the structure of the power steering apparatus can be achieved.

Fifth Embodiment

Figure 14:
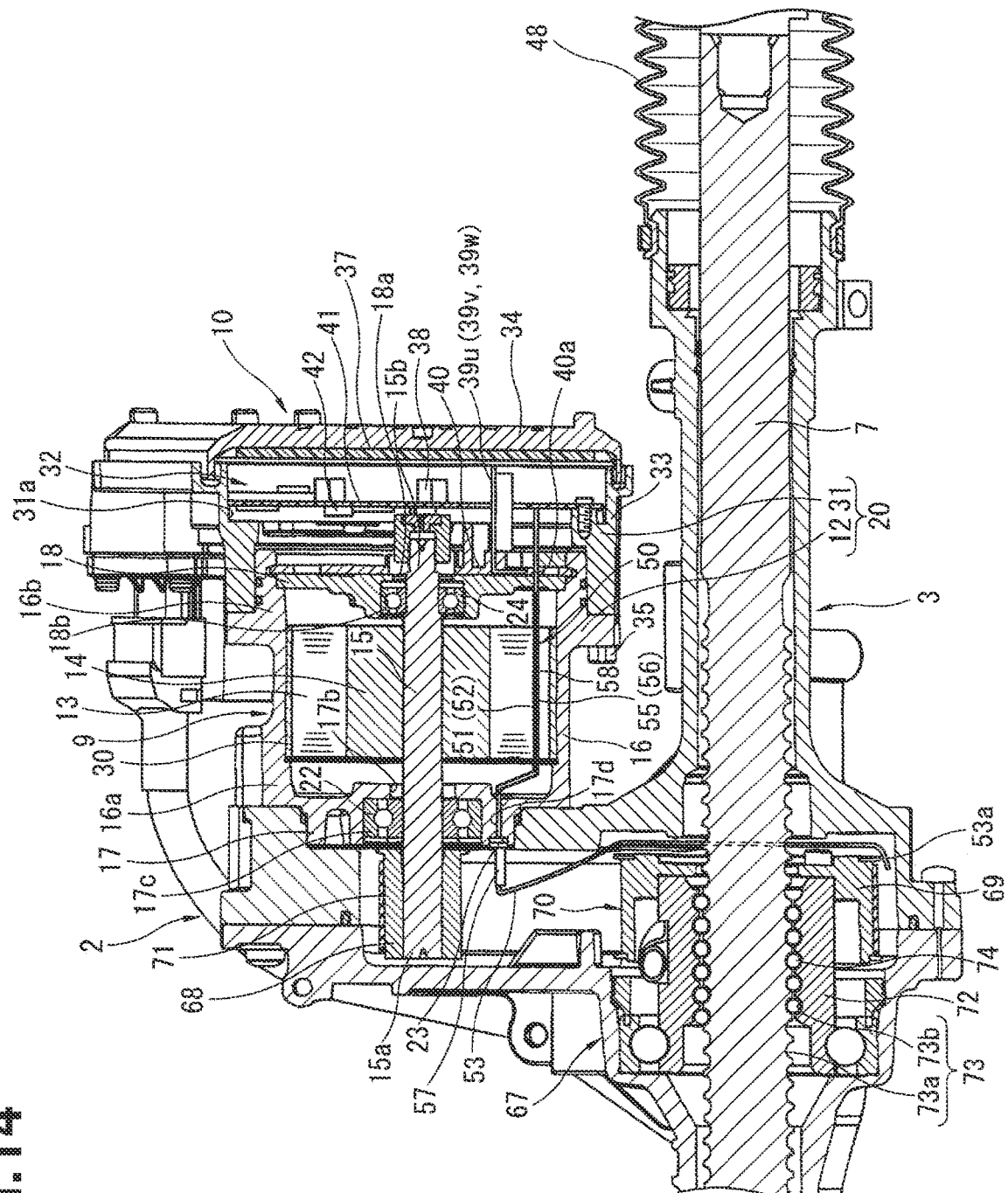
FIG. 14 is a longitudinal cross sectioned view of the power steering apparatus in a fifth preferred embodiment according to the present invention.

FIG. 14 shows a fifth preferred embodiment according to the present invention. The basic structure is the same as that of the fourth preferred embodiment. However, the structure of moisture detection sensor 30 is partially modified.

That is, moisture detection sensor 50 in this embodiment is constituted by a single electrode 51 only in association with the abolishment of second electrode 52 and the invasion of moisture into the inner part of housing member 3 can be detected by the electrical conduction of moisture detection section 53 of this electrode 51 to housing member 3 via the invaded moisture.

In addition, in association with the modification of this moisture detection sensor 50, control circuit 32 monitors moisture detection sensor 53 while outputting the electrical signal to moisture detection section 53 at all times or for each constant period and determines that the invasion of moisture into the inner part of housing member 3 by the electrical conduction of moisture detection section 53 to housing member 3.

Hence, even in this embodiment, moisture detection of the inside (inner part) of housing member 3 by moisture detection sensor 50 can be carried out with no problem. Hence, it is of course that the substantially same actions and effects as the fourth embodiment can be obtained. As compared with the case where the moisture detection is carried out by a pair of electrodes 51, 52, one of the pair of electrodes is substituted by housing member 3. Hence, the number of parts is reduced and, thus, the simplification of the sensor structure can be achieved.

The present invention is not limited to the structure in each of the preferred embodiments described above and the structure can be modified in a range not departing from a gist of the invention.

For example, each moisture detection section 53, 54 of moisture detection sensor 50 is arranged within reduction gear housing section 46. However, each moisture detection section 53, 54 may be arranged within rack bar housing section 47.

In addition, in each of the preferred embodiments, abnormality responding section 60 is disposed in control circuit 32 as a software within microcomputer 4 to perform various abnormality responding procedures. However, it is possible to achieve an electronic circuit on board 41.

Furthermore, the thickness part between first and second moisture receiving section side engagement sections 57c, 57d of moisture receiving section 57 is utilized as spacer section 57e which functions as the spacer member so as to separate between first and second moisture detection sections 53, 54, in the first embodiment and so forth. However, it is possible to separate first and second moisture detection sections 53, 54 from each other by a predetermined distance by an installation of a separate spacer member from moisture receiving section 57.

In addition, in the first and second embodiments, moisture receiving section 57 is disposed in a state in which moisture receiving section 57 is slightly spaced apart from the lower section of the inner peripheral surface of wall section recessed section 17a of one side wall 17. However, it is possible to install moisture receiving section 57 may be mounted on the lower section of the inner peripheral surface of wall section recessed section 17a. In this case, since moisture receiving section 57 is from the beginning held by the lower section of the inner peripheral surface of wall section recessed section 17a, drop out of moisture receiving section 57 and grommet 23 themselves can effectively be suppressed.

As the power steering apparatus based on the respective embodiments described hereinabove, for example, the following aspects can be considered.

As one aspect of the power steering apparatus, the power steering apparatus, comprising: a steering mechanism including: a steering shaft which rotates in association with a rotation of a steering wheel; and a rack bar which steers steerable wheels by an axial movement of the rack bar in association with the rotation of the steering shaft; an electrically driven motor including: a motor housing section; a stator and a rotor, both of which are disposed within the motor housing section; and a drive shaft which rotates in association with the rotation of the rotor; a control unit including: a control circuit which drivingly controls the electrically driven motor; a control circuit housing section which houses the control circuit; and an ECU housing section, the ECU housing section being formed to communicate with the motor housing section in an inner part of the ECU housing section and constituting a motor ECU housing section together with the motor housing section; a reduction gear which transmits the rotation of the drive shaft to the steering mechanism; a rack bar housing section in an inner part of which at least a part of the rack bar is housed; a reduction gear housing section which houses the reduction gear, which is formed to communicate with the rack bar housing section and the motor ECU housing section, and which constitutes a housing member together with the motor ECU housing section and the rack bar housing section; a moisture detection sensor including: a moisture detection section disposed in an inner part of the reduction gear housing section or the rack bar housing section to detect moisture; and a transmission section which is formed to extend from the moisture detection section into the motor ECU housing section and serves to transmit an electrical signal between the moisture detection section and the control circuit by an electrical connection of the moisture detection section with the control circuit; and an abnormality responding section disposed in the control circuit to perform an output of an alarm signal or to perform an information storage of the moisture detection when moisture is detected by the moisture detection sensor.

As a preferred aspect of the power steering apparatus, the motor housing section is disposed between the ECU housing section and the reduction gear housing section and the transmission section is formed to extend to the control circuit housing section passing through the inner part of the motor housing section.

As another preferred aspect of the power steering apparatus, in any one aspect of the power steering apparatus, a range of the transmission section which is disposed in the inner part of the motor housing section is covered with an insulation material.

As a further another aspect of the power steering apparatus, in any one aspect of the power steering apparatus, the stator includes a stator core formed of a magnetic material and a coil wound around the stator core, the stator core includes a stator core recessed section in a concave shape disposed at an outside of the drive shaft in a radial direction of the drive shaft and extends in a axial direction of the drive shaft, and the transmission section is disposed in order for at least a part of the transmission section to be housed within the stator core recessed section.

As a further another aspect of the power steering apparatus, in any one aspect of the power steering apparatus, the motor housing section includes: a cylindrically shaped tubular section; and a wall section disposed at a position of a more reduction gear side than the rotor and the stator in an axial direction of the drive shaft and formed by a separate body from the cylindrically shaped tubular section, the wall section includes a penetrating hole penetrated in the axial direction of the drive shaft, and the moisture detection sensor is disposed to penetrate through the penetrating hole.

As a further another aspect of the power steering apparatus, in any one aspect of the power steering apparatus, the stator includes: a stator core formed of a magnetic material; a coil wound around the stator coil; and a bobbin formed of a resin material and holds the coil and the bobbin has a bobbin side engagement section with which the transmission section is engaged.

As a further another aspect of the power steering apparatus, in any one aspect of the power steering apparatus, the electrically driven motor includes a stator cover enclosing an outer peripheral side of the stator and the transmission section is housed within the stator cover.

As a further another aspect of the power steering apparatus, in any one aspect of the power steering apparatus, the power steering apparatus includes a moisture receiving section which holds moisture and which is disposed at a lower side in a vertical direction of the moisture detection section.

As a further another aspect of the power steering apparatus, in any one aspect of the power steering apparatus, the housing member includes a wall section which partitions the motor ECU housing section and the reduction gear housing section, the wall section includes: a penetrating hole through which the moisture detection sensor is penetrated along the axial direction of the drive shaft; and a grommet formed of a resin material or a rubber material, disposed within the penetrating hole to liquid-tightly seal between the penetrating hole and the moisture detection sensor and wherein the moisture receiving section is integrally formed with the grommet.

As a further another aspect of the power steering apparatus, in any one aspect of the power steering apparatus, the housing member includes a wall section which partitions the motor ECU housing section and the reduction gear housing section, the wall section includes: a penetrating hole through which the moisture detection sensor is penetrated along the axial direction of the drive shaft; and a grommet formed of a resin material or a rubber material, disposed within the penetrating hole to liquid-tightly seal between the penetrating hole and the moisture detection sensor and wherein the moisture receiving section is integrally formed with the grommet.

As a further another aspect of the power steering apparatus, in any one aspect of the power steering apparatus, the moisture receiving section includes a moisture receiving side engagement section which is engaged with the moisture detection sensor.

As a further another aspect of the power steering apparatus, in any one aspect of the power steering apparatus, the control circuit includes bus bars through which an electric power is supplied to the electrically driven motor from a battery mounted in a vehicle and a resin-made bus bar mold member in which the bus bars are in-mold formed and a transmission section holding section in which the transmission section is held is integrally formed with the bus bar mold member.

As a further another aspect of the power steering apparatus, in any one aspect of the power steering apparatus, the transmission section is in-mold molded with the bus bar mold member.

As a further another aspect of the power steering apparatus, in any one aspect of the power steering apparatus, the electrically driven motor includes a bearing which is disposed in the motor housing section to hold the drive shaft rotatably 15 with respect to the motor housing section and the moisture detection section is disposed at a lower side in the vertical direction than the bearing.

As a further another aspect of the power steering apparatus, in any one aspect of the power steering apparatus, the control circuit includes a connector section by which the transmission section is held by the control circuit and is electrically connected to the control circuit by an insertion of the transmission section along the axial direction of the drive shaft.

As a further another aspect of the power steering apparatus, in any one aspect of the power steering apparatus, the moisture detection section includes: a first moisture detection section formed of an electrically conductive material; and a second moisture detection section which detects an invasion of moisture by an electrical conduction with the first moisture detection section via moisture and a spacer member is disposed between the first moisture detection section and the second moisture detection section to separate the first moisture detection section and the second moisture detection section by a predetermined distance.

As a further another aspect of the power steering apparatus, in any one aspect of the power steering apparatus, the moisture detection section includes a first moisture detection section formed in a bar shape with an electrically conductive material and a second moisture detection section formed in another bar shape with another electrically conductive material and configured to detect an invasion of the moisture by an electrical conduction with the first moisture detection section via the moisture, a bending section being disposed in either one of the first moisture detection section and the second moisture detection section to be bent in order for a region of respective outer peripheral surfaces of the first moisture detection section and the second moisture detection section to mutually approach and oppose to each other to be increased.

As a further another aspect of the power steering apparatus, in any one aspect of the power steering apparatus, the control circuit includes: a microcomputer configured to calculate a command signal to be transmitted to the electrically driven motor; and a board on which the microcomputer is mounted, the transmission section being directly connected to the board.

As a further another aspect of the power steering apparatus, in any one aspect of the power steering apparatus, the housing member is formed of an electrically conductive material and the moisture detection section detects an invasion of moisture through an electrical conduction of the housing member via moisture.

As a further another aspect of the power steering apparatus, in any one aspect of the power steering apparatus, the moisture detection section is disposed to reach a lowest section in a vertical direction of the inner part of the reduction gear housing section.

As a further another aspect of the power steering apparatus, in any one aspect of the power steering apparatus, the moisture detection section includes: a base section disposed to extend from the transmission section side; and a tip section connected to the base section and formed to extend toward a lowest section in a vertical direction of the inner part of the reduction gear housing section.

The invention claimed is:

1. A power steering apparatus, comprising:
   a steering mechanism including: a steering shaft which rotates in association with a rotation of a steering wheel; and a rack bar which steers steerable wheels by an axial movement of the rack bar in association with the rotation of the steering shaft;
   an electrically driven motor including: a motor housing section; a stator and a rotor, both of which are disposed within the motor housing section; and a drive shaft which rotates in association with the rotation of the rotor;
   a control unit including: a control circuit which drivingly controls the electrically driven motor; a control circuit housing section which houses the control circuit; and an ECU housing section, the ECU housing section being formed to communicate with the motor housing section in an inner part of the ECU housing section and constituting a motor ECU housing section together with the motor housing section;
   a reduction gear which transmits the rotation of the drive shaft to the steering mechanism;
   a rack bar housing section in an inner part of which at least a part of the rack bar is housed;
   a reduction gear housing section which houses the reduction gear, which is formed to communicate with the rack bar housing section and the motor ECU housing section, and which constitutes a housing member together with the motor ECU housing section and the rack bar housing section;
   a moisture detection sensor including: a moisture detection section disposed in an inner part of the reduction gear housing section or the rack bar housing section to detect moisture; and a transmission section which is formed to extend from the moisture detection section into the motor ECU housing section and serves to transmit an electrical signal between the moisture detection section and the control circuit by an electrical connection of the moisture detection section with the control circuit; and
   an abnormality responding section disposed in the control circuit to perform an output of an alarm signal or to perform an information storage of the moisture detection when moisture is detected by the moisture detection sensor.

2. The power steering apparatus as claimed in claim 1, wherein the motor housing section is disposed between the ECU housing section and the reduction gear housing section and the transmission section is formed to extend to the control circuit housing section passing through the inner part of the motor housing section.

3. The power steering apparatus as claimed in claim 2, wherein a range of the transmission section which is disposed in the inner part of the motor housing section is covered with an insulation material.

4. The power steering apparatus as claimed in claim 2, wherein the stator includes a stator core formed of a magnetic material and a coil wound around the stator core, the stator core includes a stator core recessed section in a concave shape disposed at an outside of the drive shaft in a radial direction of the drive shaft and extends in a axial direction of the drive shaft, and the transmission section is disposed in order for at least a part of the transmission section to be housed within the stator core recessed section.

5. The power steering apparatus as claimed in claim 2, wherein the motor housing section includes: a cylindrically shaped tubular section; and a wall section disposed at a position of a more reduction gear side than the rotor and the stator in an axial direction of the drive shaft and formed by a separate body from the cylindrically shaped tubular section, the wall section includes a penetrating hole penetrated in the axial direction of the drive shaft, and the moisture detection sensor is disposed to penetrate through the penetrating hole.

6. The power steering apparatus as claimed in claim 2, wherein the stator includes: a stator core formed of a magnetic material; a coil wound around the stator coil; and a bobbin formed of a resin material and holds the coil and the bobbin has a bobbin side engagement section with which the transmission section is engaged.

7. The power steering apparatus as claimed in claim 2, wherein the electrically driven motor includes a stator cover enclosing an outer peripheral side of the stator and the transmission section is housed within the stator cover.

8. The power steering apparatus as claimed in claim 1, wherein the power steering apparatus includes a moisture receiving section which holds moisture and which is disposed at a lower side in a vertical direction of the moisture detection section.

9. The power steering apparatus as claimed in claim 8, wherein the housing member includes a wall section which partitions the motor ECU housing section and the reduction gear housing section, the wall section includes: a penetrating hole through which the moisture detection sensor is penetrated along the axial direction of the drive shaft; and a grommet formed of a resin material or a rubber material, disposed within the penetrating hole to liquid-tightly seal between the penetrating hole and the moisture detection sensor and wherein the moisture receiving section is integrally formed with the grommet.

10. The power steering apparatus as claimed in claim 8, wherein the housing member includes a wall section which partitions the motor ECU housing section and the reduction gear housing section and the wall section includes a wall section recessed section formed in a concave shape to open toward the reduction gear side in the axial direction of the drive shaft.

11. The power steering apparatus as claimed in claim 8, wherein the moisture receiving section includes a moisture receiving side engagement section which is engaged with the moisture detection sensor.

12. The power steering apparatus as claimed in claim 1, wherein the control circuit includes bus bars through which an electric power is supplied to the electrically driven motor from a battery mounted in a vehicle and a resin-made bus bar mold member in which the bus bars are in-mold formed and a transmission section holding section in which the transmission section is held is integrally formed with the bus bar mold member.

13. The power steering apparatus as claimed in claim 12, wherein the transmission section is in-mold molded with the bus bar mold member.

14. The power steering apparatus as claimed in claim 1, wherein the electrically driven motor includes a bearing which is disposed in the motor housing section to hold the drive shaft rotatably with respect to the motor housing section and the moisture detection section is disposed at a lower side in the vertical direction than the bearing.

15. The power steering apparatus as claimed in claim 1, wherein the control circuit includes a connector section by which the transmission section is held by the control circuit and is electrically connected to the control circuit by an insertion of the transmission section along the axial direction of the drive shaft.

16. The power steering apparatus as claimed in claim 1, wherein the moisture detection section includes: a first moisture detection section formed of an electrically conductive material; and a second moisture detection section which detects an invasion of moisture by an electrical conduction with the first moisture detection section via moisture and a spacer member is disposed between the first moisture detection section and the second moisture detection section to separate the first moisture detection section and the second moisture detection section by a predetermined distance.

17. The power steering apparatus as claimed in claim 1, wherein the moisture detection section includes: a first moisture detection section formed in a bar shape and of an electrically conductive material; and a second moisture detection section formed in the bar shape and of the electrically conductive material and which detects an invasion of moisture by the electrical conduction with the first moisture detection section via moisture and a bending section is disposed in either one of the first moisture detection section and the second moisture detection section to be bent in order for a region of respective outer peripheral surfaces of the first moisture detection section and the second moisture detection section to mutually approach and oppose to each other to be increased.

18. The power steering apparatus as claimed in claim 1, wherein the control circuit includes: a microcomputer configured to calculate a command signal to be transmitted to the electrically driven motor; and a board on which the microcomputer is mounted, the transmission section being directly connected to the board.

19. The power steering apparatus as claimed in claim 1, wherein the housing member is formed of an electrically conductive material and the moisture detection section detects an invasion of moisture through an electrical conduction of the housing member via moisture.

20. The power steering apparatus as claimed in claim 1, wherein the moisture detection section is disposed to reach a lowest section in a vertical direction of the inner part of the reduction gear housing section.

21. The power steering apparatus as claimed in claim 20, wherein the moisture detection section includes: a base section disposed to extend from the transmission section side; and a tip section connected to the base section and formed to extend toward a lowest section in a vertical direction of the inner part of the reduction gear housing section.

* * * * *